March 3, 1970     M. V. DE JEAN ET AL     3,498,260
MACHINE FOR APPLYING COATINGS ONTO ARTICLES OF MANUFACTURE
Original Filed July 15, 1963     6 Sheets-Sheet 1

March 3, 1970 M. V. DE JEAN ET AL 3,498,260
MACHINE FOR APPLYING COATINGS ONTO ARTICLES OF MANUFACTURE
Original Filed July 15, 1963 6 Sheets-Sheet 3

Fig. 3.

Inventors:
Milton V. De Jean,
Dean E. Shaffer,
by John M. Stoudt
Attorney.

March 3, 1970  M. V. DE JEAN ET AL  3,498,260
MACHINE FOR APPLYING COATINGS ONTO ARTICLES OF MANUFACTURE
Original Filed July 15, 1963  6 Sheets-Sheet 4

Inventor:
Milton V. DeJean,
Dean E. Shaffer,
by John M. Stoudt
Attorney.

Inventors:
Milton V. DeJean,
Dean E. Shaffer,
by John M. Stoudt
Attorney.

United States Patent Office 3,498,260
Patented Mar. 3, 1970

3,498,260
MACHINE FOR APPLYING COATINGS ONTO ARTICLES OF MANUFACTURE
Milton V. De Jean, Pitcairn, Pa., and Dean E. Shaffer, Fort Wayne, Ind., assignors to General Electric Company, a corporation of New York
Continuation of application Ser. No. 569,373, Aug. 1, 1966, which is a division of application Ser. No. 295,073, July 15, 1963, now Patent No. 3,355,310. This application July 18, 1968, Ser. No. 746,690
Int. Cl. B05c 11/14; B05b 13/02
U.S. Cl. 118—70            12 Claims

ABSTRACT OF THE DISCLOSURE

A machine especially adapted for applying coatings on pre-selected surfaces of a magnetic core, including a rotatable member which carries a plurality of article holders in angularly spaced apart relationship. The holders are each mounted for independent rotation relative to the rotatable member and are independently movable between extended and retracted positions. These holders are periodically driven from a loading station A, to a coating applying station B, and to an article unloading station C, where the coated article is removed. After removal from the holder, the holder passes into a reconditioning station D where excess coating material is removed from the circumference of the holder.

---

This application is a continuation of our application Ser. No. 569,373, filed Aug. 1, 1966, now abandoned, which is a division of our co-pending application Ser. No. 295,073 filed July 15, 1963, now U.S. Patent No. 3,355,-310. This invention relates in general to a machine for applying coatings on articles of manufacture and more specifically to a machine particularly adapted for use in connection with the application of coatings of insulating material onto the desired locations of magnetic cores of electrical devices, such as stator and armature cores for dynamoelectric machines.

Electrical inductive devices, such as dynamoelectric machines, customarily include one or more core members formed on magnetic material which are provided with a series of slots for accommodating excitation windings. These windings are ordinarily composed of a number of turns of magnet wire conductors having a thin covering of insulation. Since the cores conventionally include a stack of thin laminations which have been stamped out of magnetic sheet material, the edges of the laminations, especially at the entrances of the slots on each side face of the core, contain burrs and other sharp projections produced by the stamping operation. The projections, unless properly covered with insulation material, tend to cause breaks in the wire insulation ultimately resulting in possible short circuit of the wire conductors.

For this and other reasons, it is necessary to provide an imperforate ground insulation between the core and the winding, both in the slots and at the slot edges, which is sufficiently thin in cross section to permit optimum utilization of slot area for the windings, yet will not break down at the maximum temperatures encountered during machine operation.

In the past there have been numerous proposals for providing insulating material between the windings and the walls of winding slots and slot entrances as well as end faces of cores. One of the most desirable approaches concerns the formation of an adherent, protective, integral insulating layer from fusible powder coating material, such as thermo-setting epoxy resin, on these pre-selected core surfaces after the core has been preheated to a particular temperature. The heat energy emitted from the walls coalesces the applied powder material into the integral layer. Normally such material melts, flows slightly, and coalesces onto the core walls with the proper adhesion in the temperature range of 190° C. to 232° C. Examples of this type of resin are "Scotchcast" Brand Resins, Nos. 260 and XR 5070, commercially available from Minnesota Mining and Manufacturing Company, St. Paul, Minn.

A practical difficulty, however, has been encountered in applying the coating material onto the core walls while the core is preheated in the proper range. For instance, depending upon the core mass, at the outer exposed surfaces of the core which are to receive the powder material, the core has a tendency to cool rapidly below the critical temperature range; e.g., in some cases, within one-half minute. Thus, there has been a problem in furnishing low cost equipment, suitable for the mass production manufacture of cores, which is not only capable of forming the layer of insulating material on the walls with the requisite adhesive and uniformity of thickness qualities, but is also efficient and rapid in operation.

Consequently, it is a general object of the present invention to provide an improved machine for applying coatings onto articles of manufacture and a more specific object to provide a machine suitable for use in connection with the formation of improved coatings or layers of insulating material on the desired surfaces of cores for electrical devices, such as stator and armature cores employed in dynamoelectric machines.

It is a further object of the invention to provide an improved machine which overcomes the difficulties and problems mentioned above.

It is another object of the present invention to provide an improved machine for applying a coating having the desired qualities mentioned above which is simple in construction, efficient, and rapid in operation, and is capable of use in the mass production manufacture of articles having differing configurations.

It is still a further object of the present invention to provide an improved arrangement for holding an article of manufacture to be coated while being transported through a series of related work stations.

Another object of the invention is the provision of an improved machine having a number of related, successive, work stations or stages wherein the article to be coated is readily mounted onto an expansible article holder-mask, a coating or layer having the desired characteristics is applied onto preselected surfaces of the article while the holder is rotated, the coated article is readily removed from the holder, and the article holder is reconditioned for the next cycle of operation.

In carrying out the objects of this invention in one form thereof, we provide a machine especially adapted for applying an electrical insulation coating of powder electrical insulating material onto spaced apart or separated, preselected and preheated surfaces of an article, such as a magnetic core of an electrical inductive device. The machine includes a rotatable member which carries a plurality of article holders in angularly spaced apart locations, the holders being mounted for independent rotation relative to the assembly. The machine also includes an arrangement for periodically driving the holders successively between article handling and powder insulating material-applying stations, for example, from an article loading station, then to a coating applying station, to an article unloading station, and finally into a holder reconditioning station. These stations are disposed in angularly spaced apart relation with respect to one another and are arranged in the path of travel of the article holders. Each holder itself comprises a flexible member having a retracted position, in which the article and holder may be moved relative to one another, and an extended position in which the flexible member is arranged to frictionally engage the article. In the extended position, the member serves to support the article while making the part of the article engaged by the member in a region which is not to be coated. These holders are individually rotated in the coating applying and holder reconditioning stations. Each of the flexible members is maintained in the extended position in these two stations while respectively the coating is being applied and the holder is being reconditioned. Adjacent the article loading and unloading stations, each of the flexible members is moved between the extended and retracted positions respectively for placing the article on the holder or for dismantling the coated article from the machine.

Among other features and advantages of this machine, a generally uniform adherent layer of material is formed on the desired surfaces of the article by economical equipment which is capable of rapid, yet efficient mass production operation, especially in the manufacture of magnetic cores for electrical inductive devices.

The subject matter which we regard as our invention is particularly pointed out and distinctly claimed in the concluding portion of this specification. Our invention, itself, however, both as to its organization and method of operation, together with further objects and advantages thereof may best be understood by reference to the following description taken in connection with the accompanying drawings:

Figure 1:
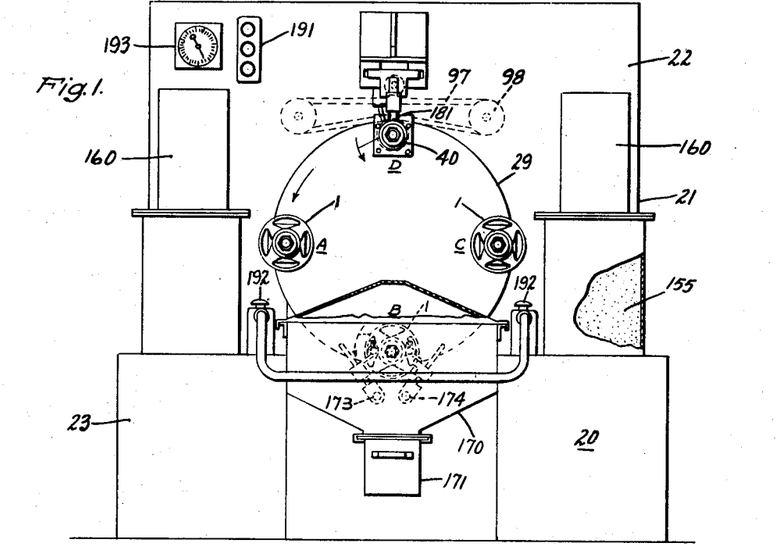
FIGURE 1 is a front view of an article coating machine having a number of angularly spaced apart work stations, the machine incorporating the preferred embodiment of the present invention.
Figures 2, 9, 10:
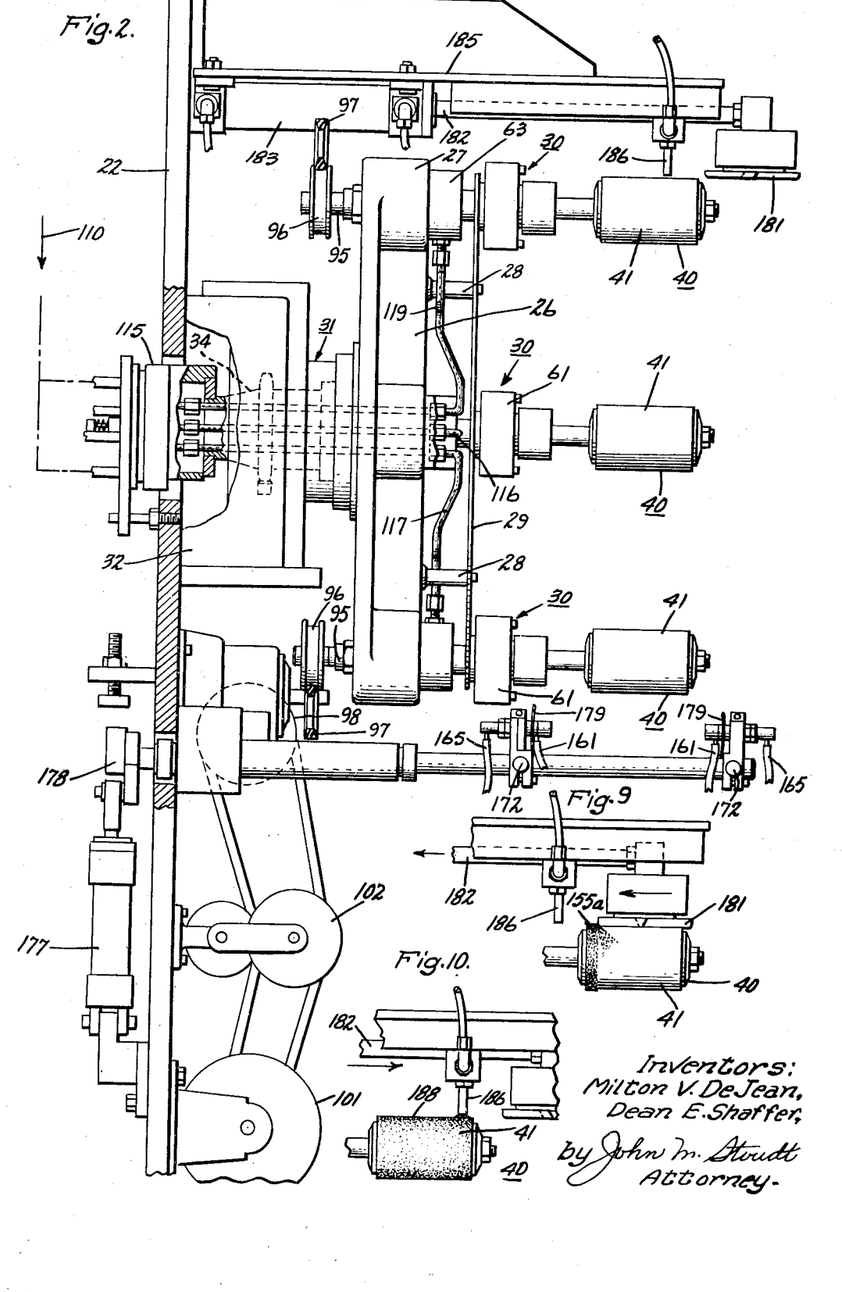
FIGURE 2 is an enlarged side view, partially broken away to show details, of a portion of the machine seen in FIGURE 1.
FIGURE 9 is a fragmentary view showing a part of the reconditioning operation being preformed on the holder in the reconditioning station.
FIGURE 10 is a view similar to FIGURE 9 showing a second reconditioning operation on the holder being completed.
Figure 3:
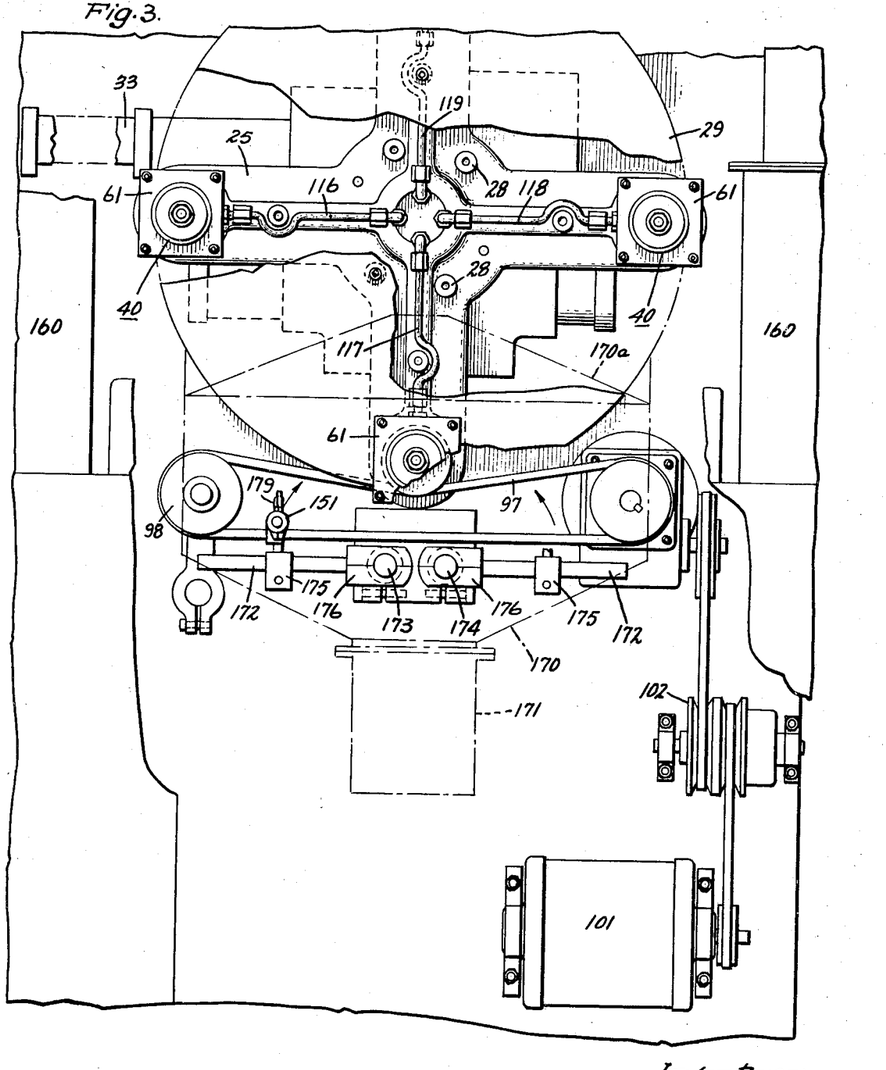
FIGURE 3 is an enlarged rear view of the machine of FIGURE 1.

Now, with more specific reference to the drawings, the preferred form of an automatic coating applying machine 20 is shown generally in FIGURES 1–3 and includes a metal frame 21 having a vertical or upright support wall 22 and a number of covers 23. The machine, especially adapted for use in the formation of an adherent, integral insulation coating on desired locations in cores for electrical inductive devices, is provided with a plurality of angularly spaced apart work stations or stages. In the illustrated embodiment, these stations are four in number, designated by letters A–D inclusive, respectively denoting a loading station, a coating applying or spraying station, an unloading station, and an article holder reconditioning station. These stations, which are located 90 degrees apart, will be described in detail hereinafter. A turntable, disposed somewhat centrally of wall 22 and rotatably supported thereby, is formed of a cast member 25 having a plurality of radial arms 26 corresponding in number and angular spacing to the stations. Each arm terminates at its outer end in a cylindrical section 27 carrying an arrangement, generally indicated at 35, to detachably mount an article holder assembly 40 for independent rotation relative to member 25.

Figure 11:
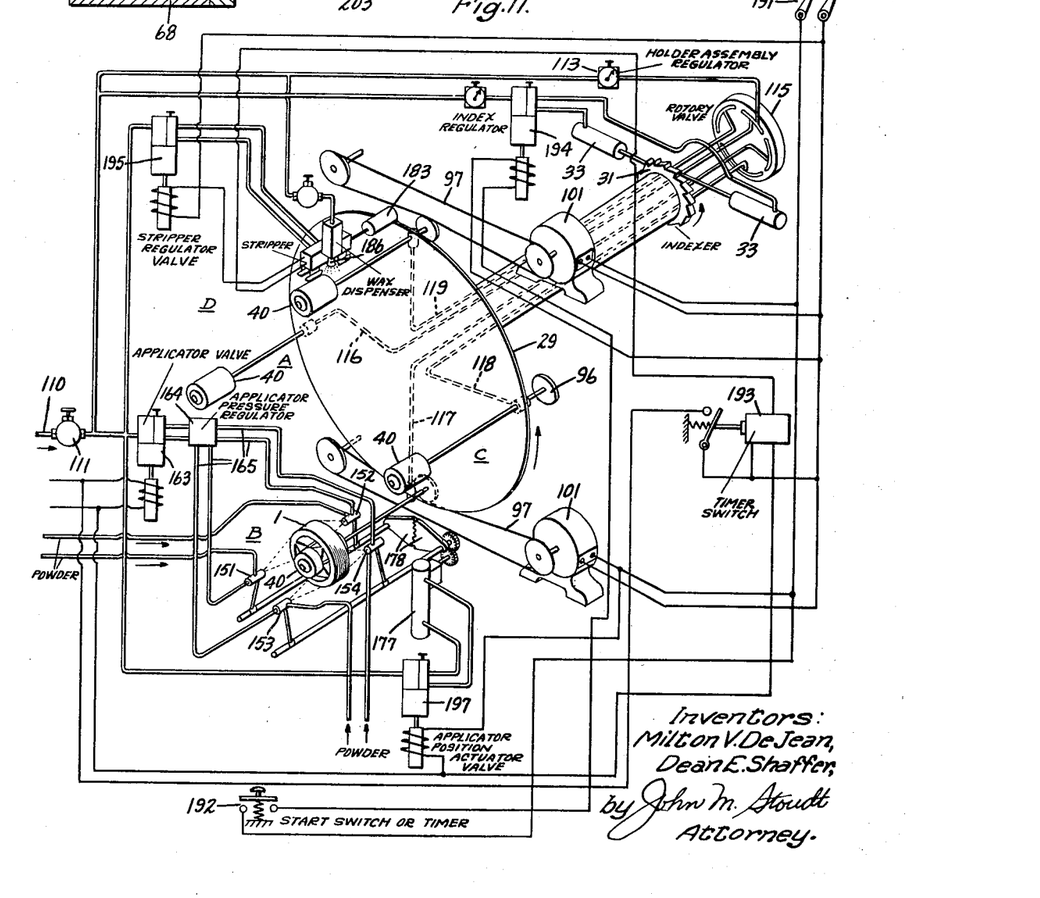
FIGURE 11 is a schematic representation with self-explanatory legends identifying the electrical and fluid pressure controlling mechanisms and systems of the machine.

Any suitable means may be employed for imparting intermittent motion to rotate member 25 for turning the holder assembly 40 successively from one work station to another in a timed 90° step by step fashion. Any indexer unit, shown generally at 31 in FIGURE 2, may be used centrally of member 25, such as air actuated Erickson Model 600 available from Erickson Tool Company of Cleveland, Ohio. Unit has a frame 32 suitably secured to and supported by wall 22 which also functions to mount member 25 for periodic movement relative to the work stations, as by cooperating air actuated cylinders 33 and ratchet driver 34 attached to member 25 (FIGURES 3 and 11).

It will be observed at this time from the drawings that the article to be coated in the exemplification is a laminated stator core 1 of the salient pole type, formed from magnetic material, such as electrical grade iron. The core conventionally includes a central annular bore 2 and a number of angularly spaced apart winding accommodating slots 3 which extend axially through the core and terminate at side faces 4 where winding pins 5 project away from the core. The walls of slots 3 and side faces 4 are the regions or walls of the stator core on which an adherent coating of insulating material is formed in this exemplification when the core is in a preheated condition. Consequently, in the preferred form, each holder assembly 40, when used with stator core 1, may be conveniently fabricated with an outer generally cylindrical or annular flexible member 41 adapted to cooperate with bore 2 of the core such that it not only supports and drives the core, but also masks the bore 2 where no coating is desired. Flexible member 41 is preferably formed of material, such as silicone rubber, which is impervious to the insulating powder and heat of the core, and is movable between retracted and extended positions at predetermined angular locations of member 25 (to be discussed later). When retracted (solid lines in FIGURE 4) the outer diameter of member 41 is slightly less than the bore diameter of the core to permit relative movement therebetween. In the extended position, shown by the broken lines in that figure, flexible member 41 is expanded sufficiently to provide a firm frictional engagement throughout the axial length of bore 2.

Although any suitable means may be utilized to control the actuation of and urge flexible member 41 between the retracted and extended positions, we have found in actual practice that the illustrated mechanism and fluid pressure system are advantageous to employ in view of the additional functions which the fluid, such as air, can perform. For use with the air pressure system, article holder assembly 40 may be conveniently constructed in the manner shown in FIGURE 4. The illustrated assembly 40 includes, by way of example, a central elongated tubular element 42 having a sleeve 43 attached thereto formed with enlargements 44 at each end. The outer surface of sleeve 43 and the interior of member 41 define an air receiving pocket 45. Flexible member 41 is attached in seated relation to these enlargements by an inwardly projecting flange 46 formed integral to each end of member 41. Flange 46 is held tightly between washer 47 and the associated enlargement in an annular groove 48 provided in the side of the enlargement. These parts are secured in place on element 42 between a shoulder 49 and nut 51 threadedly received on stud 52. The stud is in turn fastened within tubular element 42. A number of radial openings 55 connect air receiving pocket 45 with hollow center 54 for transferring fluid therebetween.

Figure 4:
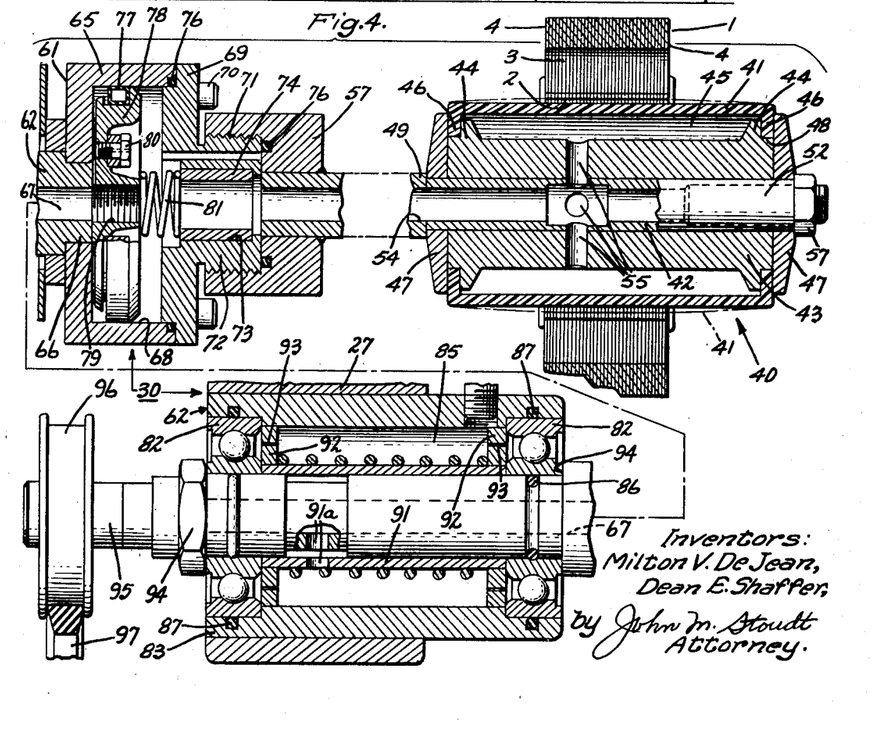
FIGURE 4 is an enlarged view in section of the preferred manner in which each article to be coated, a stator magnetic core in the exemplification, is supported for independent rotation when disposed in certain work stations.

Still referring to FIGURE 4, the illustrated arrangement 35 for detachably mounting assembly 40 for independent rotation relative to angularly movable member 25 will now be described. Arrangement 35 comprises a coupler device 61 having a hollow shaft 62 and a sealed bearing unit 63, arranged in section 27 of member 25, rotatably supporting the coupler shaft 62. With respect to coupler device 61, a cup-shaped outer housing 65 includes an opening 66 on one wall for mounting hollow shaft 62 which has a passageway 67 in communication with the interior of inner chamber 68 of the housing. On the sides of the housing, remote from shaft 62, a removable plate 69 is connected thereto by bolts 70. Centrally of this plate 69 is furnished an integral extension 72 having a central bore 73, which carries a sleeve insert 74, and a longitudinal aperture 75 running between chamber 68 and the end face of extension 72. On the outside surface thereof is formed threads 71 to engage complementing threads of collar 57 connected to the extreme end of element 42 of holder assembly 40. Suitable seals 76 may be used to make the device air tight. Confined within chamber 68 and in sealed relation with the chamber walls by annulus 77 is a piston type element 78, provided centrally thereof with a hold 79 and a needle type valve 80 outwardly thereof. A coil spring 81 is disposed between element 78 and insert 74 to bias the element towards shaft 62. The exact functions of the parts within chamber 68 will be brought out hereinafter but it should be recognized now that they permit article holder assemblies for different articles to be attached to plate 69 and passage of air therethrough.

With regard to sealed bearing unit 63, the outer races of a pair of ball bearings 82 are seated in a cast cylindrical housing 83 having a cavity 85, with the inner races being affixed to rotate with shaft 62 of coupler device 61. Resilient rings 86, 87 seal the bearing races with respect to the housing and shaft. Sleeve 91 retains the inner bearing races in their proper spaced apart relationship while a resilient annulus 92, disposed between housing 85 and sleeve 91 adjacent the bearings, provides a seal at this location for cavity 85. Very small air bleeder openings 93, formed in each annulus 92 next to the balls of the bearings, direct a fine flow of air from the cavity 85 past the balls of the ambient atmosphere to keep the balls free of powder during the coating operation. These parts are held together in assembled relation by a screw and shoulder combination indicated at 94. It should be noted at this time that cavity 85 is open to passageway 67 of coupler shaft 62 and hence chamber 45 of the holder assembly 40, by aligned holes 81 in the shaft and sleeve 91.

The extreme end 95 of shaft 62, remote from coupler device 61, is solid and protrudes beyond unit 63 to carry suitable means by which rotary motion is transmitted to the holder assembly 40, through coupler device 61, and to core 1 in the coating and reconditioning stations B and D. This means, best shown in FIGURES 2 and 3, is in the form of a sheave 96 connected to shaft end 95, which is adapted to travel into frictional engagement with belts 97, rotatably driven at stations B and D, when member 25 is turned into these stations. The belts are rotatably carried by pulleys 98 mounted to vertical wall 22 and are driven continuously by electric motor 101 by way of standard belt-speed reduction means 102, all supported by wall 22.

Returning again to the description of the illustrated fluid pressure system, air under pressure is supplied at preselected times to each bearing cavity 85 of bearing unit 63 and then through coupler device 61 to holder pocket 45 from a main line pressure source shown at 110 in FIGURE 11. A conventional valve 111 and pressure regulator 112 connect the pressure source by line 113 to a rotary manifold or valve assembly 115, which serves to control the flow of air to and from each bearing cavity 85 (and hence the holder assembly), through four tubes 116, 117, 118, and 119. Each of these tubes extends from bearing cavity 85 radially inward along arms 26 of revolvable member 25, through indexer driver 34 adjacent the axis of revolution thereof to a rotatable plate 121 of assembly 115, now to be described in detail in connection with FIGURES 2, 5, and 6.

Figure 5:
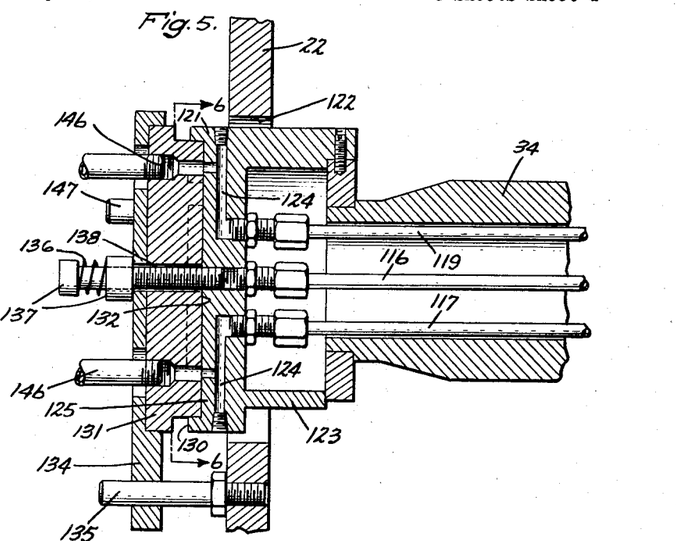
FIGURE 5 is an enlarged view of the rotating manifold and valve assembly seen in FIGURE 2 for operating the article holder at pre-selected angular positions of travel.
Figure 6:
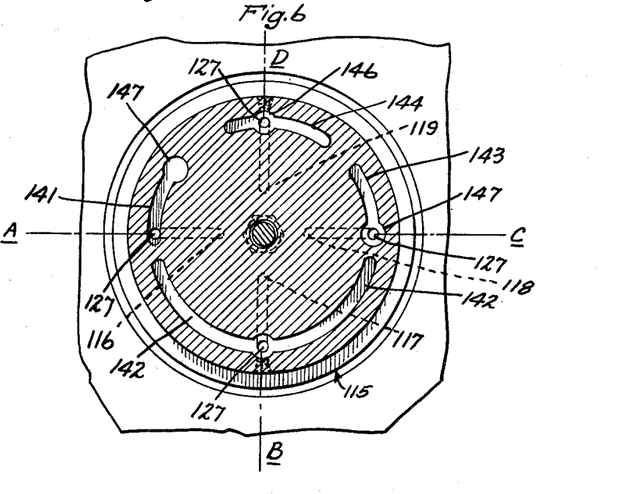
FIGURE 6 is a section taken along lines 6—6 in FIGURE 5.

On the side of plate 121 facing holder assemblies 40, a yoke section 123 surrounds the end of tubes 116–119 and is received in wall hole 122. This section joins the plate to ratchet driver 34 of the indexer 31. A number of identical bores 124, formed in the plate, extend from the various tubes, which are connected therein, and terminate at running face 125 in openings 127. All openings are at the same radius with respect to the axis of rotation of the plate. Integral with face 125 is a flange 130 which, with face 125, furnishes a sealed running relation to under face 132 of a stationary plate 131. The plate 131 is in turn attached to wall 22 by means of a flanged bracket 134 and studs 135. Plate faces 125 and 132 are maintained in the sealed, running relation by biasing spring 136 disposed between thrust collars 137 and pin 138, which passes entirely through bracket 134 and plate 131 to enter rotatable plate 121 at its center to rotate therewith.

Formed on underface 132, best shown in FIGURE 6, are four mutually isolated arc-like grooves 141, 142, 143, and 144, each having a common axis with the axis of rotation and the same radius as the bore openings 127 of face 125. Grooves 141 and 143 in the stationary plate are located at the same angular positions as the loading and unloading stations A and C. The circumferential centers of grooves 142 and 144 correspond in position to the coating applying and reconditioning stations B and D, the grooves being connected to pressure source 110 through the inlet ports 146. Each of the other grooves, that is 141 and 143, is in communication with the ambient atmosphere by suitably provided exhaust or outlet ports 147.

Consequently, by correlating FIGURE 6 with FIGURES 1 and 11, it will be observed that as each of the holder assemblies 40 pass successively into and out of stations A–D, its corresponding bore in rotatable plate 121 will be either in communication with the atmosphere via stationary grooves 141 and 143 to retract flexible member 41, or with pressure source 110, by way of grooves 142 and 144, to urge and maintain flexible member in the extended position. At locations A and C, with member 41 being retracted, it is simple to unload or load the article on the machine.

In this regard, the loading at station A (FIGURE 1) and unloading at station C of the article (core 1 of the exemplification), may be accomplished manually or by any well-known automatic transfer loading and unloading equipment (not shown). In order to expedite loading of the article to be coated, station A may be located near an oven or the like (not shown) where the core has been preheated to the requisite temperature, such as in the range of 190° C. to 232° C. Thus, the heated core can readily be removed from the oven as it emerges and loaded on holder assembly 40 at station A.

The coating applying station B will be explained with reference to FIGURES 7 and 8. Special type identical powder applicators, generally indicated by numerals 151, 152, 153, and 154, are arranged in cooperating pairs for applying powder material 155, such as epoxy resin of the kind previously mentioned, onto the side faces, edges and slot walls of core 1. In particular, each of the applicators is identically formed with central Venturi channels 156 terminating in a nozzle 157 having a divergent exit. Powder is fed to channel 156 and then to nozzle 157 by any suitable manner, by way of example, from a standard fluidized bed powder source 160 in FIGURE 1, and into the applicators through hoses 161 and ports 162. The channel end remote from the nozzle is attached to pressure source 110 (FIGURE 11) through a timed applicator valve 163, pressure regulator 164 and air lines 165 to develop predetermined pressure in the Venturi channel to cause powder material 155 to be delivered out of the nozzles 157 at low velocity; e.g., the nozzle pressure preferably being below six p.s.i.

The axis of each nozzle is disposed generally parallel to the rotation axis of holder assembly 40, with a pair of nozzles being spaced apart in face to face relation such that the nozzle exit in each pair is located adjacent the slot edges, during the spraying operation. The axial distance between the face 4 and the exit should be over one-half inch for best coverage of the slot edges.

Figure 7:
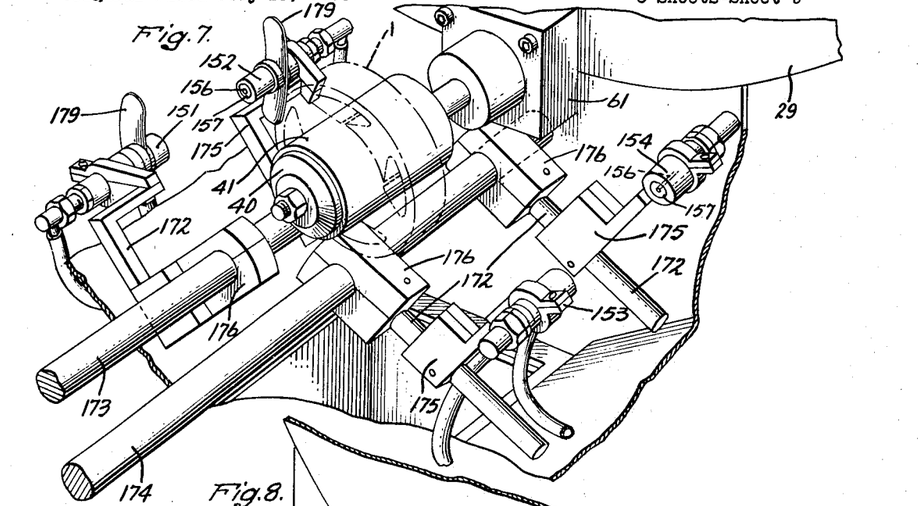
FIGURE 7 is a view in perspective of the coating applying station preparatory to actuation of the coating applying devices.
Figure 8:
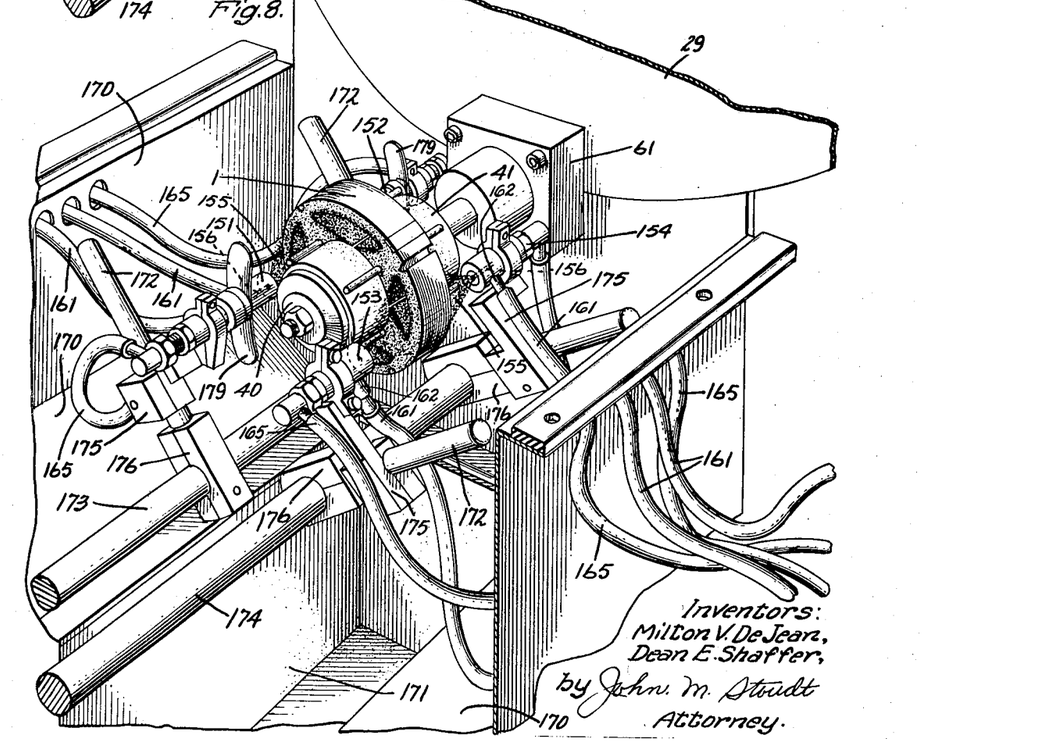
FIGURE 8 is a view similar to FIGURE 7, showing a coating being formed on preselected surfaces of the core.

The manner in which the applicators are supported in powder applying station B may also be seen from FIGURES 7 and 8. The applicators are arranged in a powder collector 170 which reclaims material not deposited on the walls of the article, and a lower hopper 171 returns this unused material to fluidized beds 160 for reuse. A rod 172 adjustably secures each cooperating pair of applicators to axles 173, 174 by two sets of clamping blocks 175, 176 with each cooperating pair being attached to one axle arranged below (as viewed in the drawings) but in spaced parallel relation to the axis of rotation of holder assembly 40. This arrangement permits relative adjustment of each applicator in radial, axial, and angular planes relative to the core being coated, as dictated by the dimensions and type of slots of the article. Movement of the applicators between the operative and inoperative locations is effected, as seen in FIGURE 2, by a standard air cylinder 177 and crank-gear assembly 178 attached to an extremity of each axle for turning the axle and consequently the applicators. In the inoperative position, the applicators are located such that they clear core 1 and core holder assembly 40 as these parts are rotated into and out of station B.

Since unloading station C has already been referred to, reconditioning station D will be outlined and may include, by way of illustration, the components shown in FIGURES 2, 9, and 10. More specifically, it will be recalled that flexible member 41 is maintained in its extended position in station D and is independently rotated therein. A blade unit 181 or other material stripping device supported axially beyond holder assembly 40 is driven across the outer surface of member 41 to clean it or strip it of excess material as assembly 40 is being rotated. This axial movement may be achieved by attaching unit 181 to a piston rod 182 actuated by cylinder 183, the parts being rigidly supported by beam 185 and wall 22. Unit 181 is moved by the cylinder and rod in the direction of the arrows shown in FIGURES 9 and 10, the unit moving entirely across the axial length of flexible member 41 during the scrapping action. In addition, a nozzle 186 may be attached to rod 182, directly behind unit 181, for applying a light film of lubricant or wax 188 onto the peripheral surface of flexible member 41 after the excess material has been removed from member 41 by unit 181. This film serves as a shield on member 41 to prevent the powder material of station B from becoming embedded into the flexible member. The film also reduces the sliding friction of the core relative to member 41 when the core is loaded thereon at station A. Of course, if desired this later film applying or similar protective operation could be performed in a separate station disposed angularly beyond station D.

The way in which machine 10 of the illustrated embodiment operates, may be best understood by reference to the FIGURE 11, taken primarily in conjunction with FIGURES 1, 4, 6, and 8. The machine operator energizes the machine by closing main switch 191 which excites electric motors 101 to drive belts 97 at a preselected speed. Flexible member 41 of holder assembly 40, disposed in loading station A, will be in a retracted position for the reasons already set forth, the holder assembly being exhausted to the atmosphere by reason of valve assembly 115 (FIGURE 6). After the article to be coated (heated core 1 of the exemplification), has been slid onto flexible member 41, operation of indexer 31 may be initiated by manual control switch or timer means, indicated at 192, which in turn operates solenoid valve 194 to actuate index cylinders 33. As assembly holder 40 and bore opening 127 in valve assembly 115 are moved in concurrence from A toward station B, after an angle of 15°, opening 127 in valve assembly 115 travels beyond exhaust groove 141 and into communication with groove 142 in the stationary plate, connecting holder assembly pocket 45 to the air pressure source 110 through inlet port 146, tube 116, bearing unit 63, and piston element hole 79 of coupler device 61. Flexible member 41 is thus urged to its extended position (the broken lines in FIGURE 4) where firm engagement is made with the entire circumference of core bore 2. A pressure of twenty p.s.i. in air pocket 45 is sufficient to perform this movement. Air moving into and out of pocket 45 has the tendency to effect a slight cooling of flexible member 41, keeping its temperature low.

Switch 192, when closed, also energizes a timer switch 193 which actuates solenoid valve 197 to open the air cylinders 177 to pressure source 110 after rotatable member 25 has been stopped by indexer 31 with holder assembly 40 disposed in station B. The applicators are swung from their inoperative (FIGURE 7, by operation of cylinders 177) to the operative (FIGURE 8) positions where the applicator nozzles 157 are arranged adjacent to the faces 4 of the core. It should be also noted that as the holder assembly 40 is being turned into station B, sheave 96 on shaft end 95 travels into frictional engagement with the continuously rotating belt 97, and the holder assembly 40 is independently rotated at a predetermined speed. In order to keep the powder within collector 170, a thin circular plate 29 may be supported on rotatable member 25, adjacent coupler device 61, by bolts and integral posts 28 projecting outwardly from the member 25. In addition, a generally U-shaped cover 170a may be mounted over powder collector 170 and provided with an opening sufficiently large to permit core 1 and holder assembly 40 to be rotated into and out of the powder applying station.

Powder is fed to the applicators by Venturi action after assembly 40 is in station B. Initiation of the powder application is also started by timer switch 193 which controls actuation of applicator solenoid valve 163. Powder 155 is applied onto the core faces 4, slot edges, and into the slots 3 as the core is rotated sufficiently slow to permit penetration of the powder material to the center of the core slots. Depending upon the thickness of the layer desired, the nozzle pressures, speed of core rotation, and density of the powder mass being applied, are all regulated to meet the particular layer thickness requirements for the given article. However, it has been found in actual practice that for optimum coating results with respect to magnetic cores for electrical inductive devices, it is desirable to rotate the cores at a relatively low speed, that is, not substantially above thirty r.p.m. while maintaining low powder velocity passing from this nozzle exit (e.g., preferably below six p.s.i.). This slow rotation does not appreciably affect the cooling rate of the core 1 at its exposed surfaces. Good results have been achieved with a synthetic polyester resin of the kind disclosed and claimed in U.S. Patent No. 2,936,296—Precopio and Fox, assigned to the General Electric Company as well as with other insulating powder resins.

Each set of applicators cooperate to direct a mass of powder into the slots from the opposed nozzles 157 such that the opposed powder flows produce particle collision of the opposed streams in the vicinity of the center of the slots. This action appears to create a slight turbulence therein for depositing the powder somewhat uniformly along the extent of the heated core slot walls. Baffles 179 may be mounted on each applicator to redirect the powder which does pass through the slots back into them. The heat from the core melts the powder material on the walls, with the material flowing slightly into a coating, and coalesces into a layer. Since member 41 never reaches the melting temperature of the material 155, no layer will be formed on the outer surface of the member. Moreover, due to the masking function of the expanded flexible member, no powder is deposited on the bore 2 of core 1.

Once melted, the resin usually remains in a liquid form in the neighborhood of nine to twelve seconds after it has been deposited on the walls. If the powder material is allowed to coalesce on the walls of core 1 at the periphery of member 41 into a somewhat hardened layer, a bridge may be formed, making it difficult to remove the core from the holder assembly. Moreover, once hardened, this bridge may form an undesirable ridge at that location. Thus, it is desirable to dismantle core 1 from member 41 in unloading station C as soon as possible. When the desired amount of material 155 has been deposited on core 1, which may take no longer than seven–nine seconds, timer switch 193 opens and solenoid valves 163 and 197 are deenergized to discontinue the application of powder and to return the applicators to their inoperative positions. Indexer 31 then turns member 25 and holder assembly 40 from station B to unloading station C.

Just prior to entrance of holder assembly 40 into the unloading station C, bore opening 127 becomes aligned with stationary groove 143 and outlet port 147 of valve assembly 115, thus venting holder pocket 45 to the ambient. Flexible member 41 is returned to its retracted position, allowing the core 1 to be readily and rapidly dismantled from assembly 40. Consequently, member 41 and core 13 are in firm engagement for the greater portion of the angular travel of the parts from station A to C to insure proper support for core 1. Moreover, since operation of flexible member 41 is performed in the preferred embodiment during each indexing part of the cycle, e.g., a duration of 1½ seconds, no time is lost at the loading and unloading stations to accomplish this function. The reconditioning operations performed on member 41 in the reconditioning station D have already been described in detail. No further detailed explanation will be included here other than to state that its operation may also be regulated by timer switch 193 which initiates operation of solenoid valve 195 which in turn controls cylinder 183 to cause the axial travel of piston rod 182.

It is important to note that except for the indexing movement of holder assembly 40 between the stations, (e.g., 1½ seconds) all operations, such as the loading and unloading of the work article and the reconditioning operation conducted on the work holder assembly 40, are performed while the powder material is being applied to the article in station B. Since the powder application part of the cycle may be completed in about ten seconds, the entire cycle through stations A–D requires no more than forty-six seconds. Of course, this time duration for a single cycle may be varied as desired.

Figure 12:
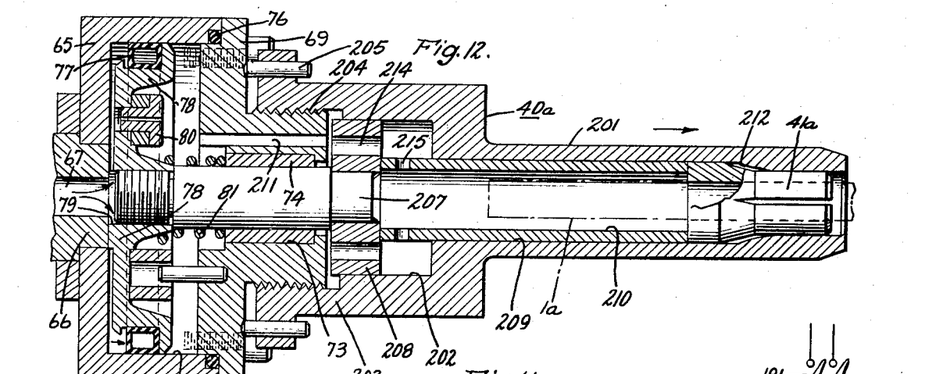
FIGURE 12 is a view in cross-section of the coupler device of FIGURE 4 mounting a work holder assembly for use in coating a dynamoelectric machine armature core.

From the foregoing it will be recognized that the machine of the present invention can be utilized to coat articles other than stator core 1. By way of example, FIGURE 12 illustrates coupler device 61 detachably mounting holder assembly 40a which, by way of example, is adapted to support a shaft 1a of a dynamoelectric armature or the like. In this embodiment, holder assembly 40a comprises an outer cast coupling shell 201 having a central passageway 202 enlarged at coupling end 203 and provided with internal threads 204 for engagement with the external threads of coupler plate 69. Pins 205 may be used to lock these pieces together, if desired, to prevent relatively angular movement. Prior to the attachment of the coupler shell 201 to device 61, a threaded pin 207 is placed into insert 74 and connected to piston element 78 via hole 79. The other end of the pin is received in a cap 208 which abuts against a sleeve 209, having shaft accommodating recess 210 for receiving shaft 1a. This sleeve, in turn, is wedged tightly against a movable flexible member or collet 41a. As with flexible member 40 for supporting stator core 1, collet 41a is movable between a retracted position (shown in solid in FIGURE 12) and an extended position in which the collet is forced to grip the shaft to support it. This movement is accomplished in the exemplification by air pressure which enters inner chamber 68 of device 61, and applies force against the face of piston element 78, overcoming the bias of spring 81, to cause the element to travel in the direction of the arrows. Pin 207, cap 208, sleeve 209, and finally collet 41a are accordingly forced to the right as viewed in FIGURE 12. The collet is reduced in cross-section and is squeezed around shaft 1a by the inner inclined wall 212 of the shell.

Air pressure is supplied to the coupler device 61 in the same manner as that already explained in connection with holder assembly 40. For instance, whenever bore openings 127 in rotatable plate 125 are in communication with grooves 142 and 144, movement of the collet into the extended position will be effected for engaging shaft 1a to support it.

Needle valve 80 of element 81, inoperative when device 61 detachably mounts assembly 40, is functional in the support of assembly 40a. It allows a small flow of air to be directed to and through the collet during the coating cycle for blowing the powder away from the collet without adversely affecting the layer being formed on the article. Air ducts 211, 214, and 215 connect the needle valve with the collet for this purpose. When valve 115 vents device 61 to the atmosphere at the loading and unloading stations, collet 41a will be returned to its retracted position by spring 81 to permit movement of the shaft 1a relative to the collet.

The principal features and advantages of the present invention have been suggested during the description of the illustrated embodiment thereof. The machine is simple in construction, efficient and rapid in operation, and is capable of use in the mass production manufacture of articles having differing configurations. The machine of this invention is also versatile in nature and can be used with a number of work holder assemblies. It should be appreciated that in order to increase the output of the machine, more than the four stations illustrated could be employed which, of course, would require a corresponding increase in the number of work holder assemblies. Additional stations, similar to those of the present invention, could also be located coaxial with the illustrated embodiment and operated by a single indexer. Furthermore, a satisfactory coating may be applied onto the article even though the article is in a heated condition during the coating operation and the article has a tendency to lose its heat at a high rate from the exposed surfaces to be coated.

What we claim as new and desire to secure by Letters Patent of the United States is:

1. In a machine for applying a coating of powder insulating material onto preselected and preheated slotted walls extending between two separated side faces of a core; a frame; a rotatable assembly supported by said frame; a plurality of core holders carried by said assembly in angularly spaced apart locations, bearing means for rotatably supporting each of the core holders with respect to said assembly; each of said core holders having means adapted to engage a predetermined part of the core for its support and for the prevention of powder insulating build-up on that predetermined part; means for periodically driving said core holders angularly into and out of a powder collector; at least one pair of generally opposed and spaced apart powder insulating material applicators mounted within the collector and arranged to face the respective side faces of the core for directing the material toward the slotted walls; means for rotating the core holders in the powder collector as material is supplied to the applicators; means for maintaining the core holder in communication with a source of fluid pressure through the bearing means as the core holder means for supporting and preventing powder build-up is being rotated in the collector, as powder material is being directed toward the slotted walls, and as the core holder means in the collector is preventing the build-up of powder material on the predetermined core part, said bearing means having sealed bearings and apertures next to the bearings for directing a small flow of fluid past the bearing to prevent powder build-up at the bearings, the coated core being removable from the core holder within twelve seconds from the time that the powder material is applied to the slotted walls of the core to prevent a hardened material bridge being formed between adjacent walls of the core whereby the machine may be used to coat cores in a powder environment without adverse effects of powder build-up 2. The machine of claim 1 in which the rotatable assembly forms at least part of a wall of the powder collector to prevent the escape of unused insulation away from the coating applying station.

3. The machine of claim 1 having means for controlling the movement of at least some of the powder insulating material applicators between operative and inoperative positions to permit the core holders to be driven into and out of the desired position between the at least one pair of applicators in the powder collector.

4. The machine of claim 1 in which a holder reconditioning station is disposed angularly adjacent a position where the coated cores are removed from the core holders, the holder reconditioning station including means having a material stripping blade adapted to engage the periphery of the core holders, and means for actuating relative movement between the material stripping blade and a selected core holder when the selected core holder is disposed in the reconditioning station.

5. In a machine for applying a coating onto an article, a frame, a rotatable assembly supported by said frame, a plurality of article holders carried by said assembly in angularly spaced apart locations, means including a sealed bearing housing and bearings therein, rotatably mounting each of said holders for independent revolution with respect to said assembly, each of said holders having a member movable between a retracted position in which the article and member may be easily moved relative to one another and in the extended position in which the member frictionally engages the article for support thereof, means controlling independent movement of said holder members between said extended and retracted positions, said latter means comprising cooperating stationary and rotatable plates having a sealed running relation therebetween, said stationary plate mounted adjacent the revolution axis of said rotatable assembly and having inlet ports therethrough for connection to a fluid pressure source, said rotatable plate attached to turn with said rotatable assembly and having openings in communication with said inlet ports at predetermined angular positions of said plates relative to one another, means connecting the openings of said rotatable plate with each of said article holders, the connecting means passing through the sealed bearing housing and including small apertures next to said bearings for directing a small flow of fluid past said bearings outwardly of said housing to prevent entrance of coating material into said housing through said bearings, said holders being connected to the fluid pressure source when said inlet ports and openings are in communication at said predetermined angular positions for operating said holder members between said positions.

6. In a machine for applying a coating of powder insulating material from a powder insulating material source onto preselected and preheated slotted walls extending between two separated side faces of a dynamoelectric core; a frame; a rotatable assembly supported by said frame; a plurality of core holders carried by said assembly in angularly spaced apart locations, coupler means for detachably mounting dynamoelectric machine stator and rotor core holders and for rotatably supporting each of the core holders with respect to said assembly; each of said core holders having means adapted to engage a predetermined part of the core for its support and for the prevention of powder insulating material build-up on that predetermined part; means for periodically driving said core holders successively between core handling and powder insulating applying stations, with the later station having a powder collector; at least one pair of generally opposed and spaced apart powder insulating material applicators mounted within the collector and arranged to face the respective side faces of the core for directing the material toward the slotted walls; means for delivering said powder from said source to said applicators; control means for rotating the core holders in the powder collector and for concurrently supplying material to the applicators; means for maintaining the core holder in communication with a source of fluid pressure as the core holder means for supporting and preventing powder build-up is being rotated in the collector, as powder material is being directed toward the slotted walls, and as the core holder means in the collector is preventing the build-up of powder material on the predetermined core part, the coated core being removable from the core holder at the core handling station within twelve seconds from the time that the powder insulating material is applied to the preheated slotted walls of the core to prevent a hardened material bridge being formed between adjacent walls of the core.

7. The machine of claim 6 in which the rotatable assembly forms at least part of a wall of insulation collector to prevent the escape of unused insulation away from the coating applying station.

8. The machine of claim 6 in which a holder reconditioning station is disposed angularly adjacent the position that the coated cores are removed from the core holders, the holder reconditioning station including means having a material stripping blade adapted to engage the periphery of the core holders, and means for actuating relative movement between the material stripping blade and a selected core holder when the selected core holder is disposed in the reconditioning station.

9. A machine for applying an electrical insulation coating of powder insulating material from a powder insulaing material source onto spaced apart, preselected and preheated surfaces of a core comprising a rotatable assembly; a plurality of core holders carried in angularly spaced apart locations by said assembly and mounted for independent rotation relative to said assembly said core holders having means adapted to engage a peripheral part of the core for support thereof and for preventing powder insulating material build-up on that peripheral part; means for periodically driving said holders successively at least between a core handling station and a powder insulating applying station, with said stations being disposed in angularly spaced apart relation relative to one another; means mounted in said powder insulating material applying station, including at least one pair of generally opposed and spaced apart powder applicators arranged to face the preselected and preheated surfaces of the core, for applying the electrical insulation coating thereto as the core is being supported by the core holder in the powder insulating material-applying stations; means for rotating said core holders in at least said powder insulating material-applying station; means for supplying powder insulating material to said powder applicators as the core holder and core supported thereby are concurrently rotated, with the at least one pair of powder applicators adapted to face the preselected and preheated core surfaces; means for delivering said powder from said source to said applicators; control means for maintaining the core holder in communication with a source of fluid pressure to furnish fluid at a preselected regulated pressure to the core holder as the core holder is being rotated in the powder insulating applying station, as the powder insulating material is being supplied to the powder applicators, and as the means adapted to engage the peripheral part of the supported core prevents powder material build-up thereon; and means for interrupting communication of the core holder with the source of fluid pressure when the core holder is disposed in the core handling station, whereby the coated core may be removed from the core holder within twelve seconds from the time powder insulating material is deposited on the core to prevent formation of a hardened insulating bridge between adjacent preselected core surfaces.

10. The machine of claim 9 having means for controlling the movement of at least some of the powder applicators between operative and inoperative positions to permit the core holders to be driven into and out of the desired position between the at least one pair of powder applicators at the powder insulating material-applying station.

11. A machine for applying an electrical insulation coating of powder insulating material onto spaced apart, preselected and preheated surfaces of a core comprising a rotatable assembly; a plurality of core holders carried in angularly spaced apart locations by said assembly and mounted for independent angular movement relative to said assembly, said core holders having means adapted to support a peripheral part of the core and to prevent powder insulating material build-up on that peripheral part; first means for periodically driving said holders successively at least between a core handling station and a powder insulating applying station, with said stations being disposed in angularly spaced apart relation relative to one another; second means mounted in said powder insulating material-applying station, including at least one pair of generally opposed and spaced apart powder applicators arranged to face the preselected and preheated surfaces of the core, for applying the electrical insulation coating thereto as the core is being supported by the core holder in the powder insulating material-applying stations; third means for imparting angular movement to said core holders in at least said powder insulating material-applying station; means for supplying powder insulating material to said powder applicators as the core holder and core supported thereby are concurrently moved angularly, with the at least one pair of powder applicators adapted to face the preselected and preheated core surfaces; fourth means for maintaining the core holder in communication with a source of fluid pressure to furnish fluid at a preselected regulated pressure to the core holder as the core holder is being angularly moved in the powder insulating applying station, as the powder insulating material is being supplied to the powder applicators, and as the means adapted to engage the peripheral part of the supported core prevents powder material build-up thereon; and control means for regulating operation of the first, second, third and fourth means to effect a transfer of the core holder from the powder insulating material-applying station to the core handling station for removal of the coated core from the core holder within twelve seconds from the time powder insulating material is deposited on the core thereby to prevent formation of a hardened insulating bridge between adjacent preselected core surfaces.

12. The machine of claim 11 including coupler means for detachably mounting core holders of different configurations capable of selectively supporting dynamoelectric machine stator and rotor cores.

References Cited

UNITED STATES PATENTS

| | | |
|---|---|---|
| 2,390,457 | 12/1945 | Pearson et al. |
| 2,426,391 | 8/1947 | Emerson. |
| 2,493,001 | 6/1960 | Socke. |
| 3,185,131 | 5/1965 | Manning. |
| 3,247,004 | 4/1966 | Dosser. |
| 3,291,630 | 12/1966 | Deyle et al. |

WALTER A. SCHEEL, Primary Examiner

JOHN P. McINTOSH, Assistant Examiner

U.S. Cl. X.R.

118—301, 308, 318, 319, 326